March 10, 1959  J. J. PARKER ET AL  2,877,022
EXPANSIBLE ARBOR WITH SEGMENTAL SLEEVES
Filed May 16, 1957

INVENTORS
JOHN J. PARKER & LONDON T. MORAWSKI
BY
ATTORNEYS.

2,877,022

EXPANSIBLE ARBOR WITH SEGMENTAL SLEEVES

John J. Parker and London T. Morawski, Detroit, Mich.

Application May 16, 1957, Serial No. 659,571

7 Claims. (Cl. 279—2)

This invention relates to expansible arbors such as may be used for supporting work pieces having a bore for purposes of machining or gaging the work piece.

With known types of expansible arbors, when high accuracy is needed in long production runs, difficulty is experienced in having contact with the bore of the work piece over a high percentage of its surface area if the arbor is to be made of hardened wear-resisting metal. Known arbors having a high percentage of surface contact require quite substantial amounts of distortion of the metal itself either by way of circumferential stretch or of bending and for this reason the use of extremely hard long-wearing materials is not possible.

It is an object of the present invention to provide an improved expansible arbor in which not only a high percentage of contact with the bore of the work piece may be achieved, but also one in which the portions of the arbor which engage the work piece may be made from hard materials having long life and freedom from wear.

Another object is to provide an expansible arbor wherein a sleeve is utilized which is formed from a plurality of segments of hardened metal, joined together into a single piece by non-metallic flexible bonded joints.

A further object of the present invention is to provide an arbor of the class described in which the expanding sleeve may be splined to the main body of the arbor.

Further objects and advantages of the present invention will be apparent from the following description, reference being had to the accompanying drawing wherein a preferred form of the present invention is illustrated.

Figure 1:
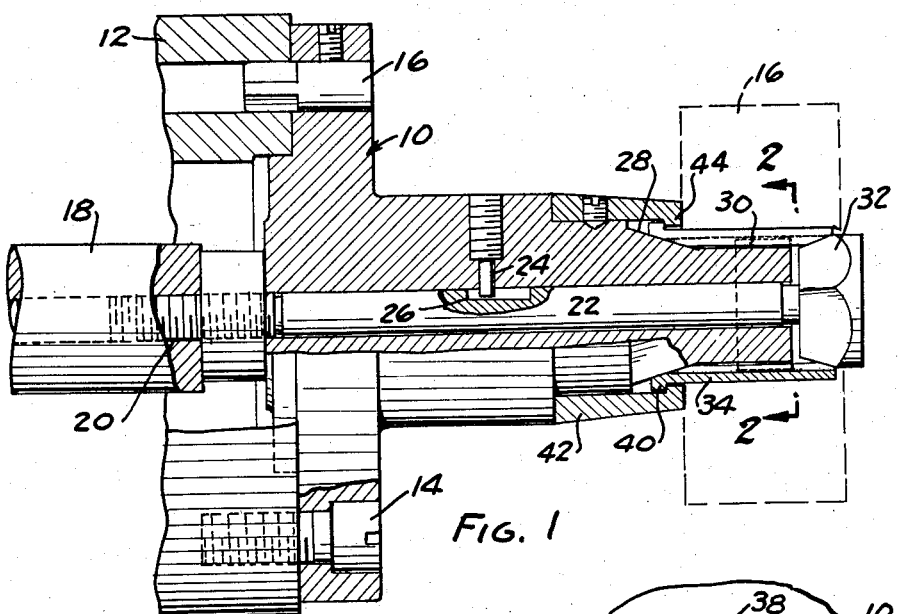
Fig. 1 is a side view partly in section of an expansible arbor incorporating a preferred form of the present invention.
Figure 2:
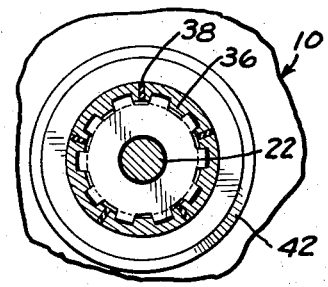
Fig. 2 is a cross section on line 2—2 of Fig. 1.
Figure 3:
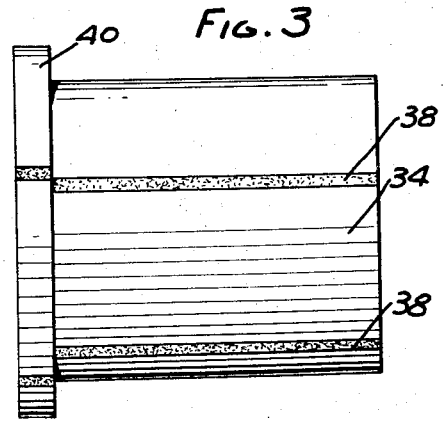
Fig. 3 is an enlarged view of a segmental sleeve forming a part of the arbor.
Figure 4:
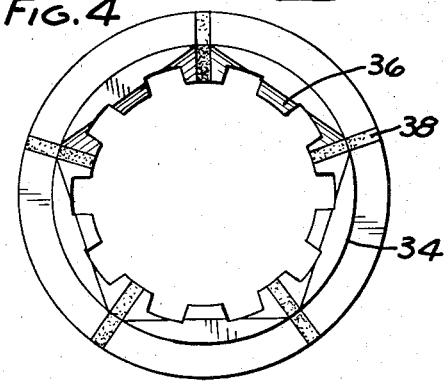
Fig. 4 is an end view of the device in Fig. 3.

The embodiment of the invention which is shown on the drawing comprises a main body member 10 which may be secured to a machine tool spindle 12 by bolts 14 and a dowel 16. The spindle is provided with a draw bar 18 having a threaded bore 20 to which an operating rod 22 is secured. A pin 24 is threaded in the body 10 to run in a keyway 26 to limit the stroke of the rod 22. The body 10 is provided with a tapered camming surface 28 which is illustrated in the form of a pyramid although it can take other shapes such as that of a cone. Beyond the camming surface 28 the body 10 has a cylindrical spline section 30.

The end of the operating rod 22 carries a second tapered camming surface 32 also illustrated as a pyramid. Mounted on the spline section 30 between the camming surfaces 28 and 32 is a composite expansible sleeve 34. The sleeve 34 is formed of a number of annular segments 36, there being five such segments in the preferred form illustrated. The segments 36 are secured together by separators 38 formed of synthetic rubber bonded to the edges of the segments 36. The internal surface of the sleeve 34 is splined to engage the splines 30. It is preferred to make the splined teeth with flat sides extending in a radial direction and to provide only a very minimum amount of clearance or back-lash in the spline. The left hand edge of the sleeve 34 is provided with a flange 40, and a retainer sleeve 42 is secured to the body 10 and has an overhanging flange 44 which engages loosely with the flange 40.

In operation, the arbor is shown in its collapsed condition with the draw bar 18 and operating rod 22 in their right hand positions. The composite sleeve 34 is thus in its innermost radial position upon the camming surfaces 28 and 32. It is preferred to make the separators 38 somewhat narrower than the gap between the segments in this position so that there is tension in the rubber of the separators when the sleeve is in its collapsed position on the cam surfaces 28 and 32. A work piece 16 may be slipped over the sleeve 34 and by drawing the bar 18 to the left, the cam 32 is wedged into the sleeve 34.

Since the segments each have flat tapered inner surfaces corresponding to the surfaces of the pyramids 28 and 32, there is established good surface contact for camming purposes which serves to expand the segments individually outwardly in a radial direction to contact the bore of the work piece. This expansion is permitted by further stretching of the separators 38.

It will be seen that the segments being somewhat thin at the toothed roots may conform to the interior of the bore of the work piece by distortion thereof which, however, is very small in amount because the radial expansion is small and the surface of the segments has very nearly the same cylindrical curvature as the bore of the work piece. During the expansion movement of the segments, the radially extending sides of the splined teeth allow some movement due to the limited back-lash between the teeth. However, because there is more than one tooth in engagement at each segment, and because the radial sides of the adjacent teeth are not parallel, the outward movement of the segments is limited to a small amount. Substantially all distortion occurs within the rubber separators which take up all of the circumferential stretch. The segments themselves, however, require only a very slight degree of distortion by way of circumferential bending in order to accommodate themselves quite closely to the work piece bore. It will be noted that the segments provide narrow zones at the roots of the teeth where such slight bending may readily occur. At the same time, the teeth themselves form much stiffer beam sections which extend longitudinally between the tapered camming surfaces.

The provision of splines with radial sides to the teeth and the use of a plurality of teeth on each segment is beneficial in obtaining accurate centering of the sleeve with respect to the main body. Thus, as the segments move outwardly, the back-lash between the splined teeth is taken up and the amount of outward movement of each segment is thereby limited. Thus, any tendency for one segment to move outwardly more than another is inhibited.

It will thus be seen that the present invention provides an expansible arbor in which the work piece bore may be contacted over a large percentage of its surface by means of work engaging members which may be formed of very hard materials because no substantial distortion thereof is required during the expansive motion.

While the form of embodiment of the invention as herein disclosed constitutes a preferred form, it is to be

What is claimed is as follows:

1. An expansible arbor comprising a central body member having a tapered camming surface, a central operating member having an oppositely facing tapered camming surface movable toward and away from the first surface, a cylindrical splined section formed upon said body member intermediate the camming surfaces and a composite expansible sleeve comprising generally annular segments of hardened metal and radially extending separators of rubber-like material bonded to the metal segments, the segments having internally tapered ends and a splined interior engaging said cylindrical splined section, the spline teeth having radially extending straight sides.

2. An expansible arbor comprising a central body member having a tapered camming surface, a central operating member having an oppositely facing tapered camming surface movable toward and away from the first surface, a cylindrical splined section formed upon one of the members intermediate the camming surfaces and a composite expansible sleeve comprising at least five generally annular segments of hardened metal and radially extending separators of rubber-like material bonded to the metal segments, the segments having internally tapered ends and a splined interior, the spline teeth having radially extending straight sides, each segment having engagement with the cylindrical splined section along at least two teeth.

3. An expansible arbor comprising a central body member having a tapered camming surface, a central operating member having an oppositely facing tapered camming surface movable toward and away from the first surface, a cylindrical splined section formed upon one of the members intermediate the camming surfaces and a composite expansible sleeve comprising generally annular segments of hardened metal and radially extending separators of rubber-like material bonded to the metal segments, the segments having internally tapered ends and a splined interior engaging said splined cylindrical portion, the sleeve having a flange at one end and a shouldered retainer secured to the body and overlapping the flange.

4. An expansible arbor comprising a body member having a tapered annular portion and a cylindrical portion projecting axially from the smaller end of the tapered portion, said body member having a through cylindrical bore extending axially through said tapered portion and said cylindrical portion, an operating member having a cylindrical shaft extending through said cylindrical bore and having an annular tapered portion at the end thereof projecting outwardly of said cylindrical portion, said two tapered portions being oppositely inclined with the cylindrical portion extending therebetween, said cylindrical portion having axially extending splines thereon and a composite expansible sleeve comprising generally annular segments of hardened metal and radially extending separators of rubber-like material bonded to and connecting said metal segments, said sleeve having its opposite ends internally tapered and engaging said oppositely inclined annular portions whereby when said shaft is shifted axially in said bore to move said oppositely inclined annular portions toward each other, said sleeve is expanded, the inner surface of said segments being axially splined and interengaging the splines on said cylindrical portion.

5. The combination called for in claim 4 wherein said shaft has an axially extending key-way therein and said body member has a key in said bore engaging said key-way to permit axial movement of the shaft and to prevent substantial rotation of the shaft relative to said body member.

6. The combination called for in claim 4 wherein said splines comprise a plurality of axially extending circumferentially spaced teeth with radially extending straight sides.

7. The combination called for in claim 6 wherein the splines in said sleeve extend axially from one of its tapered ends to the other end therein the splines on said cylindrical portion extend from adjacent the free end of said cylindrical portion to a plane spaced axially from the smaller end of the first mentioned tapered portion.

References Cited in the file of this patent

UNITED STATES PATENTS

| | | |
|---|---|---|
| 2,459,899 | Stoner | Jan. 25, 1949 |
| 2,601,419 | Spahn | June 24, 1952 |
| 2,654,413 | Weidel | Oct. 6, 1953 |
| 2,789,825 | Drew | Apr. 23, 1957 |